(12) United States Patent
Tomita et al.

(10) Patent No.: US 12,188,872 B2
(45) Date of Patent: Jan. 7, 2025

(54) ADHESION INTERFACE OBSERVATION METHOD

(71) Applicant: SUBARU CORPORATION, Tokyo (JP)

(72) Inventors: Yugo Tomita, Tokyo (JP); Tomoya Yoshida, Tokyo (JP); Takashi Iizuka, Tokyo (JP); Kosuke Kawai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 211 days.

(21) Appl. No.: 18/064,537

(22) Filed: Dec. 12, 2022

(65) Prior Publication Data

US 2023/0194431 A1 Jun. 22, 2023

(30) Foreign Application Priority Data

Dec. 22, 2021 (JP) ................. 2021-207812

(51) Int. Cl.
*G01N 21/65* (2006.01)
*G01N 1/28* (2006.01)
(Continued)

(52) U.S. Cl.
CPC ............. *G01N 21/65* (2013.01); *G01N 1/286* (2013.01); *G01N 21/658* (2013.01); *G01N 21/95* (2013.01);
(Continued)

(58) Field of Classification Search
CPC ...... G01N 21/65; G01N 1/286; G01N 21/658; G01N 21/95; G01N 21/8422; G01N 2001/2873
(Continued)

(56) References Cited

U.S. PATENT DOCUMENTS

2008/0180662 A1* 7/2008 Wang ................... G01N 21/658
356/301
2011/0124014 A1* 5/2011 Culha ................... B82Y 15/00
435/7.23
(Continued)

FOREIGN PATENT DOCUMENTS

CN 105866097 A * 8/2016 ............. G01N 1/286
CN 108982180 A * 12/2018 ............. G01N 21/65
(Continued)

*Primary Examiner* — Michelle M Iacoletti
*Assistant Examiner* — Noah J. Haney
(74) *Attorney, Agent, or Firm* — Smith, Gambrell & Russell, LLP

(57) ABSTRACT

An adhesion interface observation method is adapted to observe a region in vicinity of an adhesion interface following adhesion and curing of an adhesive that is coated on adhered members and adheres the adhered members to each other. The adhesion interface observation method includes: exposing the cured adhesive by removing one of the adhered members; forming an observation region by cutting a predetermined part of the adhesive by a predetermined thickness; obliquely cutting the observation region in an oblique direction that is inclined with respect to a thickness direction of the observation region; and observing, by a surface-enhanced Raman scattering spectroscopy, Raman scattering light generated by applying excitation light to an observation possible region that is positioned on a side, of a part of the observation region having been subjected to the oblique cutting, on which a thickness of the part of the observation region is small.

4 Claims, 3 Drawing Sheets

(51) Int. Cl.
    *G01N 21/84*          (2006.01)
    *G01N 21/95*          (2006.01)
(52) U.S. Cl.
    CPC . *G01N 2001/2873* (2013.01); *G01N 21/8422* (2013.01)
(58) Field of Classification Search
    USPC ........................................................ 356/301
    See application file for complete search history.

(56) References Cited

U.S. PATENT DOCUMENTS

2016/0061736 A1*   3/2016   Ito ........................ G01N 21/658
                                                                                   356/301
2021/0340407 A1*   11/2021   Koori ................... B32B 15/011

FOREIGN PATENT DOCUMENTS

| CN | 110426382 A | * | 11/2019 | ........... G01N 21/658 |
| --- | --- | --- | --- | --- |
| JP | 2005-265533 A | | 9/2005 | |
| JP | 2008-034786 A | | 2/2008 | |
| JP | 2017146178 A | * | 8/2017 | .............. G01N 1/28 |
| JP | 2020-055144 | | 4/2020 | |
| WO | WO-2020227450 A1 | * | 11/2020 | ............. B82Y 15/00 |

* cited by examiner

ADHESION INTERFACE OBSERVATION METHOD

CROSS-REFERENCE TO RELATED APPLICATIONS

The present application claims priority from Japanese Patent Application No. 2021-207812 filed on Dec. 22, 2021, the entire contents of which are hereby incorporated by reference.

BACKGROUND

The disclosure relates to an adhesion interface observation method. For example, the disclosure relates to an adhesion interface observation method adapted to observe an adhesion interface by a surface-enhanced Raman scattering (SERS) spectroscopy.

A quality control and a reliability assurance based on a bonding mechanism of an adhesion interface are desirable upon industrially utilizing an adhesive useful for joining of same kind or different kinds of materials. Accordingly, approaches have been made toward discovering the bonding mechanism.

Japanese Unexamined Patent Application Publication (JP-A) No. 2005-265533 discloses a cutting method and a cutting apparatus of a sample for an analysis of information such as a component in a depth direction of the sample. JP-A No. 2005-265533 discloses that a cutting tool of the cutting apparatus performs cutting of the sample at the same time while the cutting tool cuts into the sample from a surface of the sample to thereby form an inclined cutting surface that is inclined at an inclination angle $\alpha$ from the surface of the sample to the inside of the sample in a direction orthogonal to a cutting direction.

JP-A No. 2005-265533 further discloses that the analysis of the sample is made possible by analyzing, measuring, observing, and evaluating the thus-obtained inclined cutting surface of the sample by various analysis methods including, for example, an FT-IR method, a laser Raman method, an EPMA method, and a TOF-SIMS method.

Such a method that performs the analysis in the depth direction of the sample on the basis of the inclined cutting surface allows the information in the depth direction to be magnified at a magnification of $(d/\sin \alpha)$ times on the cutting surface, where "d" is an analysis depth of the sample. Thus, performing a linear analysis of the inclined cutting surface from the surface of the sample in the depth direction makes it possible to perform an analysis at a high depth resolution as compared with a case of directly performing a liner analysis of a cross-section of a sample from a surface in a depth direction.

JP-A No. 2008-34786 discloses an organic EL device fabricated by a lamination method. JP-A No. 2008-34786 discloses ensuring an analysis area by obliquely cutting organic layers to perform an analysis of joining surfaces of the respective organic layers by a method such as a microscopic infrared spectrometry or a Raman spectrometry.

JP-A No. 2020-55144 discloses an adhesion joining structure in which a first member having a metal part is joined to a second member by an adhesive layer. The adhesive structuring the adhesive layer includes a resin which is a phenoxy resin. Forming the adhesive layer with use of the adhesive that uses a specific resin like the phenoxy resin suppresses intrusion of moisture into an adhesion interface between the metal member and the adhesive layer and improves adhesion durability.

JP-A No. 2020-55144 so cuts the adhesion joining part as to have an inclination at an angle of 5 degrees by an oblique cutting apparatus from the adhesive layer toward the metal part, and perform an analysis of the adhesion interface by an IR analysis, a TEM observation, and a TOF-SIMS analysis.

It should be noted that the TOF-SIMS (Time of Flight Secondary Ion Mass Spectrometry) analysis is a method that allows for a highly sensitive evaluation of inorganic and organic components present on a surface at a molecular level and makes it possible to perform an analysis in a depth direction. JP-A No. 2020-55144 confirms the presence of Si—O—Me bonding of the adhesion interface by the method described above and determines whether a joining state is acceptable by confirming the presence of the bonding.

SUMMARY

An aspect of the disclosure provides an adhesion interface observation method adapted to observe, by an optical analysis method, a region in vicinity of an adhesion interface following adhesion and curing of an adhesive that is coated on adhered members and adheres the adhered members to each other. The adhesion interface observation method includes: exposing the cured adhesive by removing one of the adhered members; forming an observation region by cutting a predetermined part of the adhesive by a predetermined thickness to reduce a thickness of the predetermined part of the adhesive; obliquely cutting the observation region formed by the forming the observation region in an oblique direction that is inclined with respect to a thickness direction of the observation region; and observing, by a surface-enhanced Raman scattering spectroscopy, Raman scattering light generated by applying excitation light to an observation possible region that is positioned on a side, of a part of the observation region having been subjected to the oblique cutting, on which a thickness of the part of the observation region is small.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
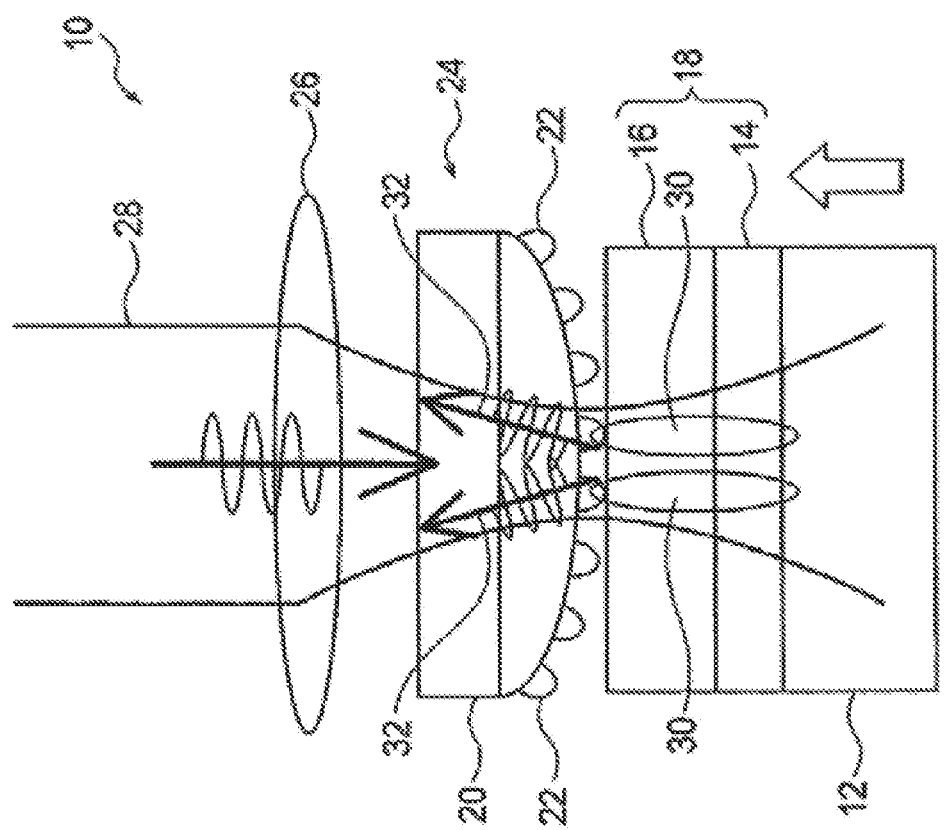
FIG. 1 is a diagram schematically illustrating a configuration of a surface-enhanced Raman scattering spectrometer to which an adhesion interface observation method according to one example embodiment of the disclosure is applied.

JP-A No. 2005-265533 discloses an inclined cutting method of a sample, and discloses analyzing, measuring, observing, and evaluating an inclined cutting surface by various analysis methods including, for example, an FT-IR method, a laser Raman method, an EPMA method, and a TOF-SIMS method. JP-A No. 2020-55144 discloses joining a metal member and another member by an adhesive, and so cutting the adhesion joining part as to have an inclination at an angle of 5 degrees by an oblique cutting apparatus from an adhesive layer toward the metal part. JP-A No. 2020-55144 further discloses analyzing the joining surface by an IR analysis, a TEM observation, and a TOF-SIMS analysis.

The methods disclosed in JP-A Nos. 2005-265533, 2008-34786, and 2020-55144, however, involve difficulties in accurately analyzing an adhesion interface. For example, observing the inclined cutting surface by the FT-IR method or the laser Raman method allows for an observation of an enlarged cross-section following the inclined cutting, only allowing for an analysis where hydrogen bonding is cut at an interface, i.e., only allowing for a so-called destructive analysis at the interface. Accordingly, it is difficult to perform an accurate analysis of the adhesion interface.

The TOF-SIMS analysis uses in combination the inclined cutting and sputtering to fabricate a sample, only allowing for the destructive analysis at the adhesion interface as with the methods described above. Accordingly, it is difficult to perform the accurate analysis of the interface.

The IR analysis is disadvantageous in resolution in a depth direction, which is in the order of about several micrometers, making it difficult to acquire information of interest on an interface of a sample configured by a metal and an adhesive and having a thickness of tens of nanometers, for example.

It is desirable to provide an adhesion interface observation method that makes it possible to observe, by a surface-enhanced Raman scattering spectroscopy, a region in the vicinity of an adhesion interface following adhesion and curing of an adhesive that is coated on adhered members and adheres the adhered members to each other.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In an example embodiment, an adhered member may be a steel plate, and an adhesive may be an epoxy-based adhesive.

FIG. 1 is a diagram schematically illustrating a configuration of a surface-enhanced Raman scattering spectrometer 10 to which an adhesion interface observation method according to the example embodiment of the disclosure is applied. The surface-enhanced Raman scattering spectrometer 10 may include a piezo stage 12, an unillustrated excitation laser, an objective lens 26, and a plasmon sensor 24. The piezo stage 12 may be a stage on which a sample 18 is to be placed. The excitation laser may be a light source of excitation light 28 to be applied to the sample 18. The objective lens 26 may focus the excitation light 28 and cause the focused excitation light 28 to be applied onto the sample 18. The plasmon sensor 24 may amplify Raman scattering light generated from the sample 18.

As described later in greater detail, the sample 18 may be a resultant in which: the adhered members 14 are attached to each other by the adhesive 16; one of the adhered members 14 is removed after curing of the adhesive 16 to expose the cured adhesive 16; and the adhesive 16 is cut by an oblique cutting apparatus, or a surface and interfacial cutting analysis system (SAICAS), to be described later. The sample 18 may be placed on the piezo stage 12. The piezo stage 12 may be moved in an optical axis direction of the objective lens 26 to adjust a focal position of the objective lens 26. For example, this allows for an adjustment of the focal position of the objective lens 26 to a surface of the adhesive 16 of the sample 18 and to a joining surface between the adhered members 14 and the adhesive 16. In the example embodiment, the piezo stage 12 may be moved with the objective lens 26 being fixed to adjust the focal position of the objective lens 26. In some embodiments, the objective lens 26 may be moved with the piezo stage 12 being fixed to adjust the focal position of the objective lens 26.

The excitation light 28 from the unillustrated excitation laser may be applied to the sample 18 through the objective lens 26. The application of the excitation light 28 may cause the Raman scattering light to be emitted from the sample 18. The Raman scattering light emitted from the sample 18 may generate a plasmon electric field 30. The Raman scattering light emitted from the sample 18 may be amplified by the plasmon sensor 24. The Raman scattering light amplified by the plasmon sensor 24 may enter the objective lens 26. With this configuration, the objective lens 26 may condense the excitation light 28 from the excitation laser onto the sample 18, and may condense surface-enhanced Raman scattering light 32 amplified by the plasmon sensor 24. In the example embodiment, the excitation light 28 may be measurement light, and the surface-enhanced Raman scattering light 32 may be detection light. It should be noted in FIG. 1 that the plasmon electric filed 30 and the surface-enhanced Raman scattering light 32 are both schematically illustrated.

The plasmon sensor 24 may include a vitreous silica 20 and a plurality of Ag particles having flat end faces that cover a surface of the vitreous silica 20. The surface of the vitreous silica 20 may be covered with the flat end faces of the Ag particles by a method such as a vacuum evaporation method or sputtering. As illustrated in FIG. 1, the Ag particles 22 may be of a buried type or an implanted type, and may have a semispherical shape in which a lower half part of a sphere is cut and removed. The Ag particles 22 may be regularly disposed at a predetermined interval on the surface of the vitreous silica 20. The plasmon electric field 30 may be generated at faces, of the Ag particles 22, that are brought close to the sample 18, allowing the surface-enhanced Raman scattering light 32 to be obtained in which an intensity of the Raman scattering light emitted from the sample 18 is increased 15,000 times.

Figure 2:
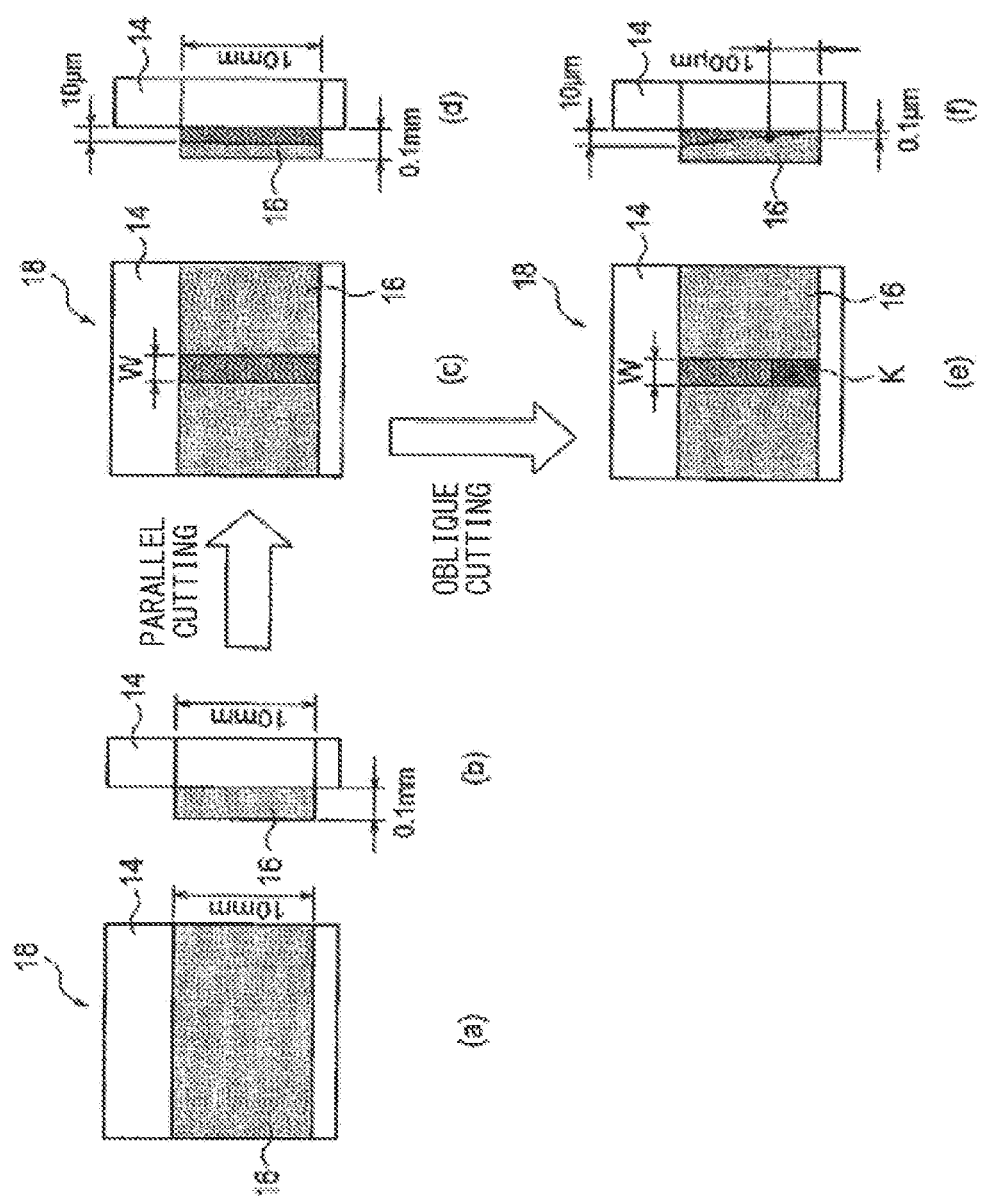
FIG. 2 is a diagram illustrating a method of producing a sample to be used for the adhesion interface observation method according to one example embodiment of the disclosure.

FIG. 2 is a diagram illustrating a method of producing the sample 18 to be used for the adhesion interface observation method according to the example embodiment of the disclosure.

The two adhered members 14 may be attached together by the adhesive 16, and one of the adhered members 14 may be removed after the curing of the adhesive 16 to expose the adhesive 16. This process may be referred to as an adhesive exposing process. Part (a) and part (b) of FIG. 2 each illustrate the adhered member 14 and the adhesive 16 following the adhesive exposing process. FIG. 2 illustrates an example of the sample 18 in which the adhesive 16 is so coated on the adhered member 14 as to have an adhesion thickness of 0.1 mm and to have an adhesion length of 10 mm. A direction of the adhesion thickness may correspond to a direction in which the excitation light 28 is to be applied.

The adhered member 14 may be the steel plate and may include a metal in the example embodiment. In some embodiments, the adhered member 14 may be a nonmetal for an observation of an adhesion interface. The adhesive 16 may be the two-pack room temperature curable epoxy-based resin in the example embodiment. In some embodiments, the adhesive 16 may be a one-pack room temperature curable epoxy-based resin, a urethane-based resin, or an acrylic-based resin.

Thereafter, a predetermined part of the adhesive 16 may be cut by a predetermined thickness to reduce a thickness of the predetermined part of the adhesive 16 as illustrated in part (c) and part (d) of FIG. 2. This process may be referred to as an observation region formation process. A cut width or a process width is denoted by a reference sign W, and may be 0.5 mm in the example embodiment. The process may be performed multiple times until a thickness of the adhesive 16 becomes 10 μm from 0.1 mm, thereby defining an observation region.

Setting the process width to 0.5 mm allows for an analysis while avoiding a concern of an interference. In a case where the cut width is small, the spherical plasmon sensor 24 can interfere with the adhesive 16 (a region having a thickness of 0.1 mm in FIG. 2) around an observation possible region K, which can prevent the plasmon sensor 24 from sufficiently coming into contact with the observation possible region K and makes it difficult to perform the analysis. The plasmon sensor 24 may have a diameter of 2.5 mm and the process width W may be set to 0.5 mm in the example embodiment, which helps to perform the analysis without causing the interference of the plasmon sensor 24 with the adhesive 16 around the observation possible region K. This means that, in the example embodiment, it helps to receive the Raman scattering light properly while avoiding the concern of the interference.

Thereafter, the adhesive 16 may be cut obliquely as illustrated in part (e) and part (f) of FIG. 2. This process may be referred to as an oblique cutting process. For example, the adhesive 16 may be subjected to parallel cutting, following which the adhesive 16 in the cut width W may be subjected to oblique cutting at 1,000 times the ratio of a cutting speed in a thickness direction to a cutting speed in a horizontal direction. The oblique cutting may be so performed that a process length by which the thickness of the adhesive 16 becomes 0.1 μm or less is at least 100 μm.

As described above, the cutting process that reduces the thickness of the adhesive 16 within a predetermined region may be performed to fabricate the observation possible region K. The observation possible region K may be irradiated with the excitation light 28, making it possible to receive the Raman scattering light properly in the observation possible region K and thereby to evaluate a state of adhesion of the adhesive 16 in the vicinity of an interface between the unremoved adhered member 14 and the adhesive 16.

In the example embodiment, the observation method based on the surface-enhanced Raman scattering light may be applied to the observation possible region K to analyze a bonding state of the adhesion interface. Thus, it helps to directly evaluate a thickness of an interface boundary layer, a bonding state of the interface boundary layer, and a distribution of concentration in the depth direction of a functional group of the interface boundary layer. It also helps to perform a degradation structural analysis associated with an adhesion joining part. Further, it helps to directly confirm the bonding state of the adhesion interface, which helps to confirm whether desired bonding and a desired structure are formed at the adhesion interface by a surface treatment.

Figure 3:
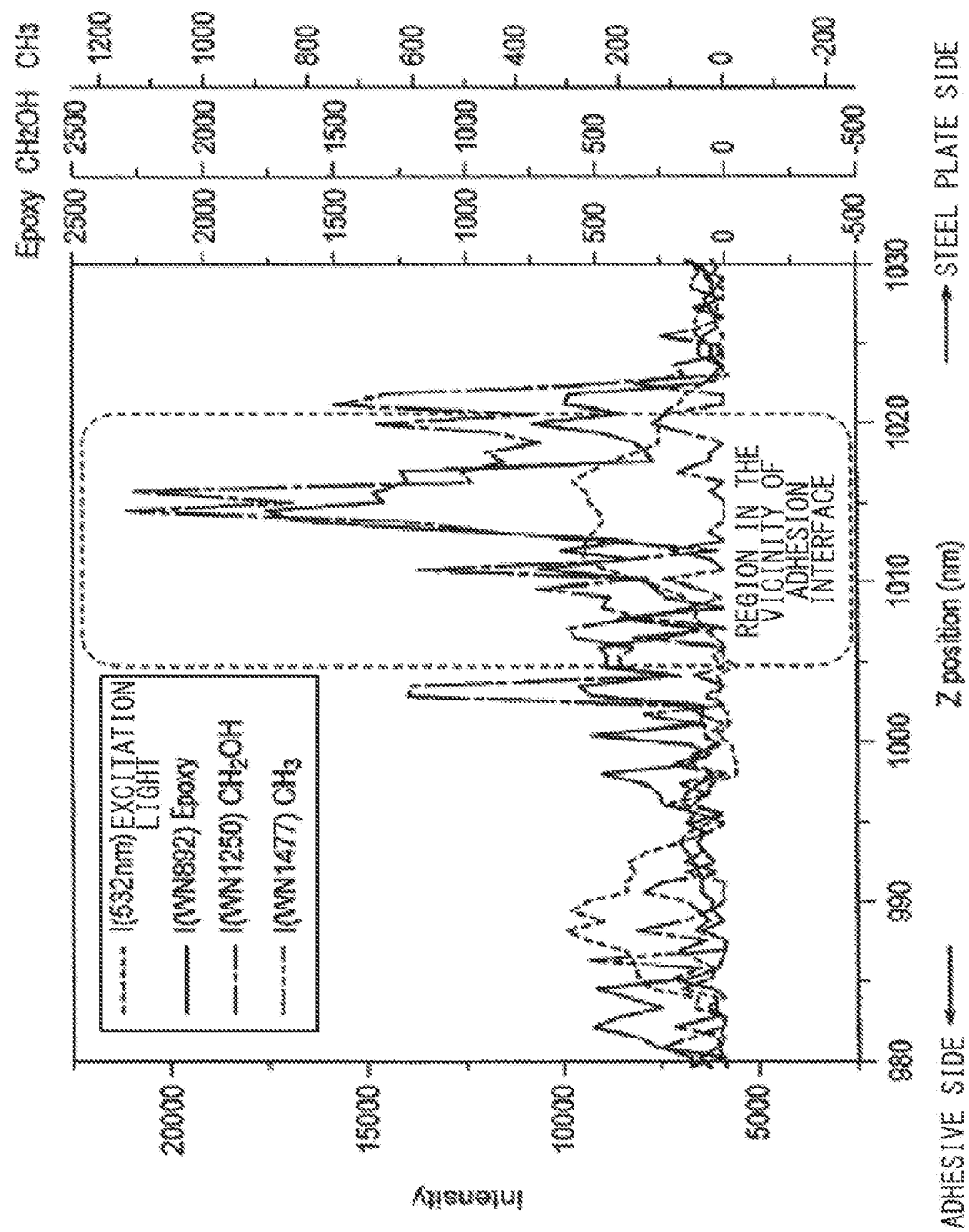
FIG. 3 is a diagram illustrating an example of a depth profile obtained by the adhesion interface observation method according to one example embodiment of the disclosure.

FIG. 3 is a diagram illustrating an example of a profile obtained by the adhesion interface observation method according to the example embodiment of the disclosure. FIG. 3 illustrates a Raman spectrum of the surface-enhanced Raman scattering light obtained on the basis of a change in an intensity of the Raman scattering light generated in the vicinity of a focal point with a focal position being moved in a depth direction Z, i.e., in a thickness direction of the adhesive 16. The thus-obtained profile is a depth profile in the vicinity of a joining surface, by which it is possible to appreciate the distribution of concentration in the depth direction of a functional group from a surface of a substance toward the inside of the substance. In FIG. 3, a horizontal axis indicates an observation position in the depth direction in nanometer unit, a left vertical axis indicates the intensity of the Raman scattering light, and a right vertical axis indicates the number of functional groups.

As can be appreciated from FIG. 3, it was confirmed that a methylol group and an epoxy group were aggregated in the vicinity of the adhesion interface. Thus, using the adhesion interface observation method according to any embodiment of the disclosure helps to analyze the bonding state of the adhesion interface, and to directly evaluate the thickness of the interface boundary layer, the bonding state of the interface boundary layer, and the distribution of concentration in the depth direction a functional group of the interface boundary layer. Accordingly, it helps to provide information on a chemical structure of the buried adhesion interface.

It also helps to provide information on a change in the chemical structure caused by a degradation of the adhesion interface. This means that it helps to clarify a factor that changes by the degradation for the degradation of the adhesion interface, which is considered to be a cause of a time degradation of the adhesion joining part. Further, it helps to assure a quality of a surface treatment that improves an adhesion property. This means that it helps to directly confirm the bonding state of the adhesion interface, which thereby helps to confirm whether the desired bonding and the desired structure are formed at the adhesion interface by the surface treatment.

The adhesion interface observation method according to the example embodiment uses the surface and interfacial cutting analysis system to obliquely cut the adhesive on the joining surface between the adhered member and the adhesive. The adhesion interface observation method helps to directly observe the Raman scattering light at the adhesion interface on the basis of the surface-enhanced Raman scattering (SERS) spectroscopy, by causing the oblique cutting to achieve a thickness of the adhesive that is equal to or less than a predetermined value at which the Raman scattering light is receivable. Accordingly, it helps to accurately evaluate the chemical structure of the buried adhesion interface in a non-destructive manner.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the sample may include the steel plate and the epoxy-based adhesive in the example embodiment. However, a configuration of the sample is not limited to that described in the example embodiment. In addition, the sample may be placed on the piezo stage in the example embodiment. However, the sample may be provided on any moving device as long as the moving device is adjustable at a level of 0.1 nm or less.

The adhesion interface observation method according to at least one embodiment of the disclosure first forms the observation region by cutting a part of the cured adhesive exposed by removing one of the adhered members. Further, the observation region is further cut obliquely by, for example, a surface and interfacial cutting analysis system (SAICAS) to form the observation possible region in a region that is positioned on a side, of a part of the observation region having been subjected to the oblique cutting, on which a thickness of the part of the observation region having been subjected to the oblique cutting is small. The surface-enhanced Raman scattering (SERS) spectroscopy applies the excitation light with the plasmon sensor being placed still on the observation possible region and brought into contact with the observation possible region to perform a high precision analysis in the order of the depth resolution of 0.1 nm. Thus, the adhesion interface observation method helps to properly receive the Raman scattering light in the observation possible region and to accurately evaluate the state of adhesion of the adhesive in the vicinity of the interface between the unremoved adhered member and the adhesive.

In the observation method based on the SERS according to at least one embodiment of the disclosure, the oblique cutting by the SAICAS is for the formation of the observation possible region and is not intended to increase information in the depth direction as disclosed in at least one of JP-As described above, allowing for a non-destructive analysis of the interface. In addition, it helps to reduce a damage on the adhesion interface as much as possible. Accordingly, it helps to perform an accurate chemical analysis of a state of the buried adhesion interface, which helps to directly evaluate, in a non-destructive manner, a factor such as the bonding state of the adhesive and the adhered member (e.g., a hydrogen bonding that bonds the adhesive and an adhered member interface) or the distribution of concentration in the depth direction of a functional group. In any existing method, the hydrogen bonding is destructed during fabrication of a sample, preventing the hydrogen bonding from being analyzed.

In some embodiments, it helps to place, into a more suitable state for the observation, a region in which the excitation light is to be applied and the Raman scattering light is to be generated, i.e., the observation possible region. Thus, it helps to acquire accurate analysis information.

In some embodiments, the process width is 0.5 millimeters or greater. In the surface-enhanced Raman scattering (SERS) spectroscopy, the spherical plasmon sensor can interfere with the adhesive around the observation possible region in a case where the cut width is small, preventing the plasmon sensor from coming into contact with the observation possible region and making it difficult to perform the analysis. Accordingly, allowing the process width to be 0.5 millimeters or greater helps to allow for the analysis without causing the interference between the plasmon sensor and the adhesive around the observation possible region.

The adhesion interface observation method according to at least one embodiment of the disclosure helps to observe, by the surface-enhanced Raman scattering spectroscopy, a region in the vicinity of the joining interface in which the adhered member and the adhesive are adhered. Accordingly, the adhesion interface observation method according to at least one embodiment of the disclosure helps to evaluate directly, accurately, and in a non-destructive manner, a factor such as the bonding state of the adhesive and the adhered member or a distribution of concentration in the depth direction of a functional group.

The invention claimed is:

1. An adhesion interface observation method adapted to observe, by an optical analysis method, a region in vicinity of an adhesion interface following adhesion and curing of an adhesive that is coated on adhered members and adheres the adhered members to each other, the adhesion interface observation method comprising:
    exposing the cured adhesive by removing one of the adhered members;
    forming an observation region by cutting a predetermined part of the adhesive by a predetermined thickness to reduce a thickness of the predetermined part of the adhesive;
    obliquely cutting the observation region formed by the forming the observation region in an oblique direction that is inclined with respect to a thickness direction of the observation region; and
    observing, by a surface-enhanced Raman scattering spectroscopy, Raman scattering light generated by applying excitation light to an observation possible region that is positioned on a side, of a part of the observation region having been subjected to the oblique cutting, on which a thickness of the part of the observation region is small.

2. The adhesion interface observation method according to claim 1, wherein
    the observation possible region has a thickness of 0.1 micrometers or less, and
    the observation possible region has a length, in a process direction of the oblique cutting, of at least 100 micrometers.

3. The adhesion interface observation method according to claim 2, wherein the observation possible region has a process width, in a direction orthogonal to a process direction of the oblique cutting, of 0.5 millimeters or greater.

4. The adhesion interface observation method according to claim 1, wherein the observation possible region has a process width, in a direction orthogonal to a process direction of the oblique cutting, of 0.5 millimeters or greater.

* * * * *